United States Patent
Burcham et al.

(10) Patent No.: US 10,733,630 B1
(45) Date of Patent: Aug. 4, 2020

(54) METHOD OF ACCESSING SERVICES FROM A MOBILE COMMUNICATION DEVICE

(71) Applicant: Sprint Communications Company L.P., Overland Park, KS (US)

(72) Inventors: Robert H. Burcham, Overland Park, KS (US); Jason R. Delker, Olathe, KS (US); Robin D. Katzer, Olathe, KS (US); Denise K. Sadler, Kansas City, MO (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1311 days.

(21) Appl. No.: 13/865,186

(22) Filed: Apr. 17, 2013

(51) Int. Cl.
*G06Q 30/02* (2012.01)
(52) U.S. Cl.
CPC .................. *G06Q 30/0267* (2013.01)
(58) Field of Classification Search
CPC ........... G06T 11/60; G06T 2207/10016; G06T 2207/10024; G06T 2207/20208; H04N 9/045; G06Q 30/0241; G06Q 30/02
USPC .......................................................... 705/14
See application file for complete search history.

(56) References Cited

U.S. PATENT DOCUMENTS

| | | | | |
|---|---|---|---|---|
| 8,365,081 B1* | 1/2013 | Amacker | | G06Q 10/10 705/27.1 |
| 8,555,170 B2* | 10/2013 | Rodriguez | | G11B 27/034 345/473 |
| 2005/0105374 A1* | 5/2005 | Finke-Anlauff | | G06F 17/30997 365/232 |
| 2007/0157089 A1* | 7/2007 | Van Os | | G06F 3/04817 715/702 |
| 2009/0158186 A1* | 6/2009 | Bonev | | G06Q 30/00 715/769 |
| 2010/0248719 A1* | 9/2010 | Scholaert | | H04M 1/725 455/434 |
| 2012/0173981 A1* | 7/2012 | Day | | G06F 3/04817 715/719 |
| 2012/0208593 A1* | 8/2012 | Yang | | G06F 3/0481 455/556.1 |
| 2013/0038742 A1* | 2/2013 | Suematsu | | G05B 19/40931 348/207.1 |
| 2013/0227607 A1* | 8/2013 | Saltonstall | | H04N 21/458 725/35 |

* cited by examiner

Primary Examiner — Breffni Baggot (57) ABSTRACT

A method of accessing services from a mobile communication device. The method comprises presenting service visual representations on a display of the device, wherein each of the service visual representations provides an interface for invoking a service, selecting advertisements for media content from a media content repository, wherein the selecting is based at least in part on the device, presenting the selected advertisements as thumbnail images on the display of the device, wherein each thumbnail image is coupled to metadata that define methods for invoking at least some of the services associated with the service visual representations, and when a first thumbnail image associated with a first selected advertisement is selected and dragged to the position of a first service visual representation, invoking a first service associated with the first service visual representation based on a method defined by metadata coupled to the first thumbnail image.

18 Claims, 7 Drawing Sheets

METHOD OF ACCESSING SERVICES FROM A MOBILE COMMUNICATION DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices such as mobile phones may provide a variety of communication services including voice communication, short message service messaging (texting), and data communication. Data communication may comprise downloading content from network content servers and uploading content such as pictures to a network server, such as a social networking site. A variety of aftermarket or third party applications may be installed on mobile communication devices to provide amusement and/or utility to the user. Some third party applications may be self-contained and provide all their functionality by executing independently on the mobile communication device. Other third party applications may provide their functionality at least in part based on delegating some processing to computer systems accessed via a communication network. Some of these third party applications may access or provide access to network services.

SUMMARY

In an embodiment, a mobile communication device having an application for invoking services related to media content is disclosed. The mobile communication device comprises a non-transitory memory, a display, a processor coupled to the non-transitory memory, and an application stored in the non-transitory memory. When executed by the processor the application presents on the display a plurality of service visual representations associated with services related to media content, selects at least one advertisement for media content from a plurality of media content, and presents on the display an advertisement thumbnail associated with the selected at least one advertisement for media content, where the advertisement thumbnail is associated with metadata that identifies a first service associated with a first one of the visual representations and that identifies a second service associated with a second one of the visual representations, wherein if the advertisement thumbnail is selected and dragged to the position on the display of the first one of the visual representations, the first service is invoked, and wherein if the advertisement thumbnail is selected and dragged to the position on the display of the second one of the visual representations, the second service is invoked.

In an embodiment, a method of accessing services from a mobile communication device is disclosed. The method comprises presenting a plurality of service visual representations on a display of the mobile communication device, wherein each of the service visual representations is associated with a service related to media content, selecting at least one advertisement for media content from a plurality of advertisements for media content, and presenting an advertisement thumbnail image associated with the at least one advertisement on the display of the mobile communication device, wherein the advertisement thumbnail image is associated with metadata that identifies a first service associated with a first one of the service visual representations and that identifies a second service associated with a second one of the service visual representations. The method further comprises, when the advertisement thumbnail is selected and dragged to the position on the display of the first one of the service visual representations, invoking the first service and when the advertisement thumbnail is selected and dragged to the position on the display of the second one of the service visual representations, invoking the second service.

In an embodiment, a method of accessing services from a mobile communication device is disclosed. The method comprises presenting a plurality of service visual representations on a display of the mobile communication device and selecting a plurality of advertisements for media content from a media content repository, wherein the selecting is based at least in part on the mobile communication device. The method further comprises presenting the selected advertisements as thumbnail images on the display of the mobile communication device, wherein each thumbnail image is coupled to metadata, and when a first thumbnail image associated with a first selected advertisement is selected and dragged to the position on the display of a first service visual representation, invoking a first service associated with the first service visual representation based on the metadata coupled to the first thumbnail image.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system for mobile phone entertainment promotions is taught herein. The system provides an application that presents a plurality of visual representations of services as well as one or more visual representations of promotional media content on a display of a mobile phone or other mobile communication device. When the user selects and drags the visual representation of the promotional media content, for example a thumbnail image of a cover of a compact disc music package, over the visual representation of one of the services, the service performs a suitable service on the promotional media content. For example, if the service is a media player, a piece of music from a compact disc may be played. If the service is an on-line retail store, the user may be logged into the on-line store and the subject compact disc may be offered for sale in a graphical user interface (GUI) window to the user. The promotional media content has metadata associated with it that defines methods to be invoked for different services, hence when the user drags the promotional media content thumbnail over a service, the service method invocation definition in the metadata that matches the service is invoked.

The services may be selected by the user for installation on the mobile communication device, for example as a third party application downloaded from an application store or a free application repository. The services or a portion of the services, for example a service client, may be downloaded dynamically from a web site or other content source via a wireless cellular communication link to the mobile communication device. Downloading a service may comprise any of downloading the instructions that are executed to employ the service, downloading instructions that invoke network services that are executed to employ the service, and/or downloading a graphical file defining a service visual representation. The application may determine which services to place on a top frame or in a default grid of services on the display. The default grid of services may be defined by a file that is controlled by the wireless service provider that provides wireless communication service for the mobile communication device, where the services and/or a visual representation of the services are dynamically downloaded by the mobile communication device based on the file. In some contexts, the visual representation of the services may be referred to as a service thumbnail. The user may be able to reconfigure the display of services to provide that the preferred services are presented.

The ads and/or promotional content that are presented in the same display with the visual representations of the services may be selected by a variety of processes. The ads or promotional content may be selected for display based in part on a bidding process that third party content providers engage in. The ads or promotional content may be selected for display based in part on a history of engagement of the user with the application and with the services. The ads or promotional content may be selected for display based in part on a demographic profile of the user. The ads of promotional content may be selected for display based in part on providing ads or promotional content from different types of entertainment content—for example based on presenting at least one music package such as a compact disc, presenting at least one video game, and presenting at least one video.

In an embodiment, the services may analyze the metadata provided by the ad and/or promotional content and infer how best to respond to the ad and/or promotional content. This alternative approach may promote adding new services in the context of legacy ad and/or promotional content. Different services of the same general category of services may choose to provide different responses, possibly creative and/or whimsical, fun, intriguing responses. For example, a first media player provided by a first third party application vendor may provide a different response to the metadata provided by the ad than the response to the same metadata provided by a second media player provided by a second third party application vendor. This variation among how services may respond to the metadata associated with the ad and/or promotional content may stimulate user experimentation which creates opportunities for impulse purchases, new customer development, or expansion of current customers to different lines of business or different genres within a line of business. For example, when an ad for a musical artist is dropped on a video game application, the video game application may respond to the metadata associated with the ad for the musical artist by launching a game with music by the artist, by launching a game with themes similar to the themes the artist explores in his or her music, or by launching a game that is popular with people buying recordings of that musical artist.

Figure 1:
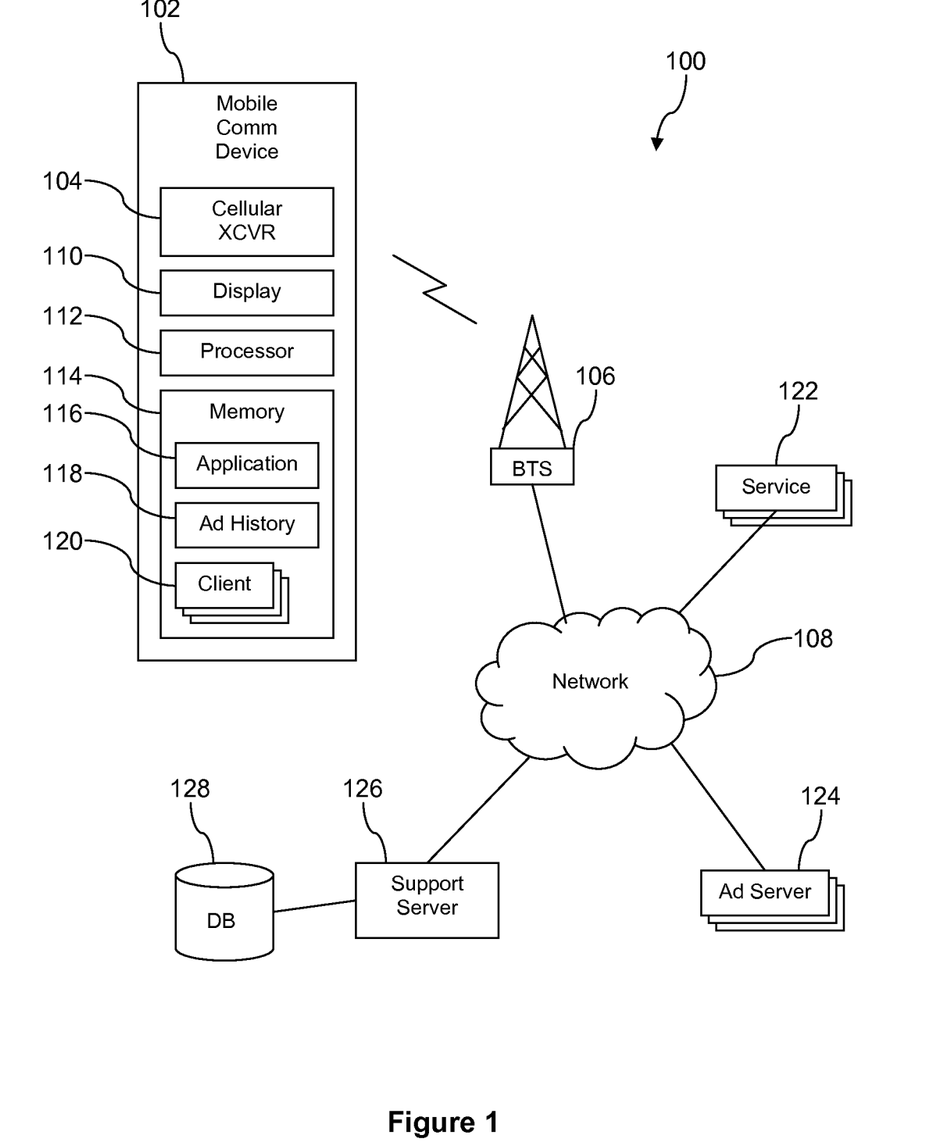
FIG. 1 is a block diagram of a communication system according to an embodiment of the disclosure.

Turning now to FIG. 1, a system 100 is described. In an embodiment, the system 100 comprises a mobile communication device 102 that communicates via a cellular radio transceiver 104 with a base transceiver station (BTS) 106. The base transceiver station 106 is communicatively coupled to a network 108 and is operable to communicatively couple the mobile communication device 102 to the network 108 and to communication devices coupled to the network 108. The mobile communication device 102 may conduct voice and data communications via the base transceiver station 106 and via the network 108. The mobile communication device 102 may send and receive email messages, text messages, or other communication messages via the base transceiver station 106. The mobile communication device 102 may send and receive content files via the base transceiver station 106.

The mobile communication device 102 may be a mobile phone, a personal digital assistant, a media player, or other mobile communication device. Further details of mobile phones are provided hereinafter. The cellular radio transceiver 104 may communicate with the base transceiver station 106 using one or more of a code division multiple access (CDMA) wireless communication protocol, a long term evolution (LTE) wireless communication protocol, a global system for mobile communication (GSM) wireless communication protocol, a worldwide interoperability for microwave access (WiMAX) wireless communication protocol, or another wireless communication protocol. While one mobile communication device 102 and one base transceiver station 106 are illustrated in FIG. 1, it is understood that the system 100 may comprise any number of mobile communication devices 102 and any number of base transceiver stations 106.

In an embodiment, the mobile communication device 102 comprises a display 110, a processor 112, and a memory 114. In an embodiment, the memory stores an application 116, an optional ad history 118, and one or more client applications 120. In some contexts, the application 116 may be referred to as an entertainment application or an entertainment zone. The application 116 may provide access to a variety of services, for example entertainment services. The services may comprise media players, media and/or content analysis services, media and/or content on-line buying services, gaming services, and other services. The services may be provided in part by one or more services 122 that are provided by servers or other devices coupled to the network 108. The services may be provided in part by one or more of the client applications 120. The services may be provided by the client applications 120 in collaboration with the services 122. In some contexts the services 122 may be referred to as network services, because they may be accessed via the network 108. The services may comprise on-line store services, media analysis services, ticket purchasing portal services, a ticket purchasing widget, media player services, and the like. Some of the services 122 may be provided by computer systems. Computer systems are described further hereinafter.

The application 116 or another feature of the mobile communication device 102 may place constraints or requirements on services that may be associated with the application 116 and/or with the entertainment zone enabled by the application 116. For example, the services 122 and/or client applications 120 may be expected to enable one or more method invocations in their application programming interfaces that conform to a specification that the application 116 is designed to support.

In an embodiment, when the application 116 executes, a plurality of the services may be presented on the display 110. The services may be presented as icons, as images, or as visual representations on the display 110. In an embodiment, the visual representations of services may be presented in a grid pattern on the display 110. In some contexts these may be referred to as service icons or service thumbnail images to distinguish them from other icons or thumbnail images. In an embodiment, the application 116 may present at least one media player service visual representation, at least one media on-line store service visual representation, and at least one media analysis service visual representation on the display 110 in a default presentation mode.

The application 116 may provide access to more services than can be presented as visual representations, images, or as icons in the display 110 at one time. The application 116 may provide user controls for navigating through the services that are available and to cause the visual representations, images, or icons associated with the selected services to be presented on the display 110. The application 116 may provide user controls for selecting the presented service visual representations to all be associated with media players or all be associated with on-line retail stores or to all be associated with ticket purchase outlets. The application 116 may provide user controls for selecting a row of a grid of service visual representations to all be media players or some other category of services.

The application 116 presents one or more ads or promotions on the display 110. For example, the application 116 may present three thumbnail images of musical artists, of a package of music such as a compact disc, and/or of a piece of music. In an embodiment, ads or promotions are presented at the bottom of the display 110. In other embodiments, however, ads or promotions may be presented in another location in the display 110. When the user of the mobile communication device 102 selects one of the thumbnail images associated with a promotion and drags the subject thumbnail image over the grid location associated with one of the services also presented on the display, the service is launched and performs the appropriate service with reference to the selected thumbnail image. In some contexts the presented ads or promotions may be referred to as promotion icons, ad icons, promotion thumbnail images, or ad thumbnail images to distinguish them from other icons or thumbnail images.

For example, if the promotional thumbnail image represents a package of music, selecting the representation of the package of music and dragging it to the grid location associated with a first service that provides a link to an on-line retail store, the on-line retail store service launches. The on-line retail store service logs the subscriber in using credentials stored by the service, for example credentials stored locally on the mobile communication device 102. The on-line retail store service presents on-line purchasing controls such as an "add to wish list" control button, an "add to shopping cart" control button, a "proceed to checkout" control button, and other control buttons. The user may rapidly complete a purchase transaction that is made more convenient by the natural action of dragging the thumbnail image of the package of music to the grid location associated with the on-line retail store.

When the thumbnail image of any promotional item or ad is selected and dragged to the grid location associated with other services, in each instance the service is invoked and performs some service that is appropriate based on the selected thumbnail or the promotional item. A second visual representation of a service may represent a service that identifies a genre or style of music based on analyzing an identified piece of music or package of music or based on looking up metadata associated with the piece of music or package of music and recommends other pieces of music or packages of music that conform to the same genre or style of music. If the representation of the package of music is dragged to the grid location associated with the second service visual representation, one or more pieces of music or packages of music may be presented on the display that are of the same genre or style of music as the music package of the promotional item. A third service visual representation may represent a service that is a media player. If the representation of the package of music is dragged to the grid location associated with the third service visual representation, the first piece of music of the package of music may be played.

The thumbnail images comprise a portion of the elements of a promotional item. The promotional item, in addition to a thumbnail image, may comprise information about the item represented by the thumbnail image. The promotional item may comprise service invocation definitions, for example method calls for methods provided by application programming interfaces (APIs) of the services. The service invocation definitions may comprise appropriate method arguments, input data, or links. In some contexts the service invocation definitions may be referred to as metadata. In some circumstances, the metadata may further comprise information about the promotional item.

In an embodiment, the application programming interface of each of the services may include an interrogation method common to all the services. The interrogation method may return an identification of the service, and this identification of the service may be employed by the application 116 to select which of the service invocation methods in the metadata of the promotional item dragged over a grid location associated with a service. Thus, when the application 116 determines that the thumbnail image of a promotion has been selected and dragged over a grid location associated with a fourth service, the application 116 invokes the interrogation method on the fourth service and obtains an identification of the fourth service. Based on the identification of the fourth service, the application 116 may then invoke a method defined in the metadata of the subject promotion that it selects based on the identification of the fourth service. Alternatively, the application 116 may determine which of the plurality of method definitions of the metadata of the subject promotion to invoke in a different way.

The application 116 may select the one or more advertisement or promotion thumbnails that it presents in the display 110 from an archive or store of promotional content. For example, the application 116 may request promotions from a support server 126 that is in communication with a promotion data store 128 that stores ads and/or promotional content and associated metadata. The application 116 may provide criteria such as demographic criteria, genre criteria, media type criteria, or other criteria to the support server 126, and the support server 126 may provide promotional content to the application 116 that accords with the provided criteria. The support server 126 may be implemented as a computer system.

The application 116 may track and analyze user inputs to the mobile communication device 102, for example interactions with the entertainment service visual representations. The application 116 may develop a service utilization profile associated with the mobile communication device 102 based on analyzing the user inputs. The application 116 may develop ad selection criteria based on the analysis of the user inputs and/or based on the service utilization profile. For example, the application 116 may determine that the user of the mobile communication device 102 engages almost exclusively with music related promotional content and rarely with gaming content or video content. Based on this analysis, the application 116 may specific a criteria that excludes both gaming content and video content. This may promote a higher efficiency of promotion and provide more utility to the user of the mobile communication device 102.

The application 116 may define different criteria for each of a small number of promotions. For example, the application 116 may define that a first promotion be selected from a music packages, a second promotion be selected from audio books, and a third promotion be selected from movies. Alternatively, and possibly based on analysis of a history of user inputs, the application 116 may define that the first promotion be selected from a music package as a blues music genre, the second promotion be selected from a music package as a jazz music genre, and the third promotion be selected from a music package as a pop music genre.

Alternatively, the application 116 may request promotional content from one or more ad servers 124. Alternatively, the support server 126, in response to a request for promotional content, possibly associated with criteria, may request promotional content from the ad servers 124. In an embodiment, the ad servers 124 may be associated with interested third parties, for example retail organizations. The ad servers 124 may be implemented as computer systems.

The ad servers 124 may be requested by the application 116 and/or by the support server 126 to offer a bid for presentation of their promotional content in the display 110 and to be part of the service access system described above. The request to bid may carry some information about the subscriber of the mobile communication device 102, for example demographic information such as income category, age category, education category, entertainment preference category, purchase volume category, and the like. In an embodiment, it may be possible for artists to participate in the ad bid process and offer a bid for presentation of their promotion in the display 110. The application 116 and/or the support server 126 may select one or more ads based on the highest bids or based on some other factor.

In an embodiment, the wireless service provider company may provide a payment model where a user purchase of an advertised item is billed to a monthly wireless communication service subscription account and collected from the user by the wireless service provider and where the wireless service provider company in turn pays the third party retailer for the user purchase. This payment model may offer a variety of perceived advantages to the third party retailers, and these perceived advantages may promote the third party retailers offering bids at higher payment rates (payment for the placement of the advertisement or promotional content on the display 110 by the application 116). In some circumstances purchase rates have been observed to increase by as much as 500% when the user can purchase promoted items without having to input confidential information such as credit card credentials or having to create an account with the third party retailer.

The application 116 may request the promotion content when the application 116 is first invoked, for example when a user selects an entertainment management page or an entertainment zone of the mobile communication device 102. The application 116 may request the promotional content periodically, for example about every minute, about every five minutes, about every ten minutes, or at some other periodic rate. The application 116 may maintain the ad history 118 or promotion presentation history and provide a control whereby a user of the mobile communication device 102 may review or call back ad or promotion content that has been presented in the past. For example, a user may recall seeing a promotional thumbnail related to a movie he or she is interested in watching but may not have had time to bookmark, to purchase, or to watch earlier. Later, other promotional content may replace the earlier promotional content in the display 110. By activating the ad history control one or more times, the user may be able to recall to the display 110 earlier presented promotional content. In that instance, the application 116 may look up ad or promotional content references from the ad history 118, retrieve the promotional content using the references, and present the subject promotional content.

Figure 2:
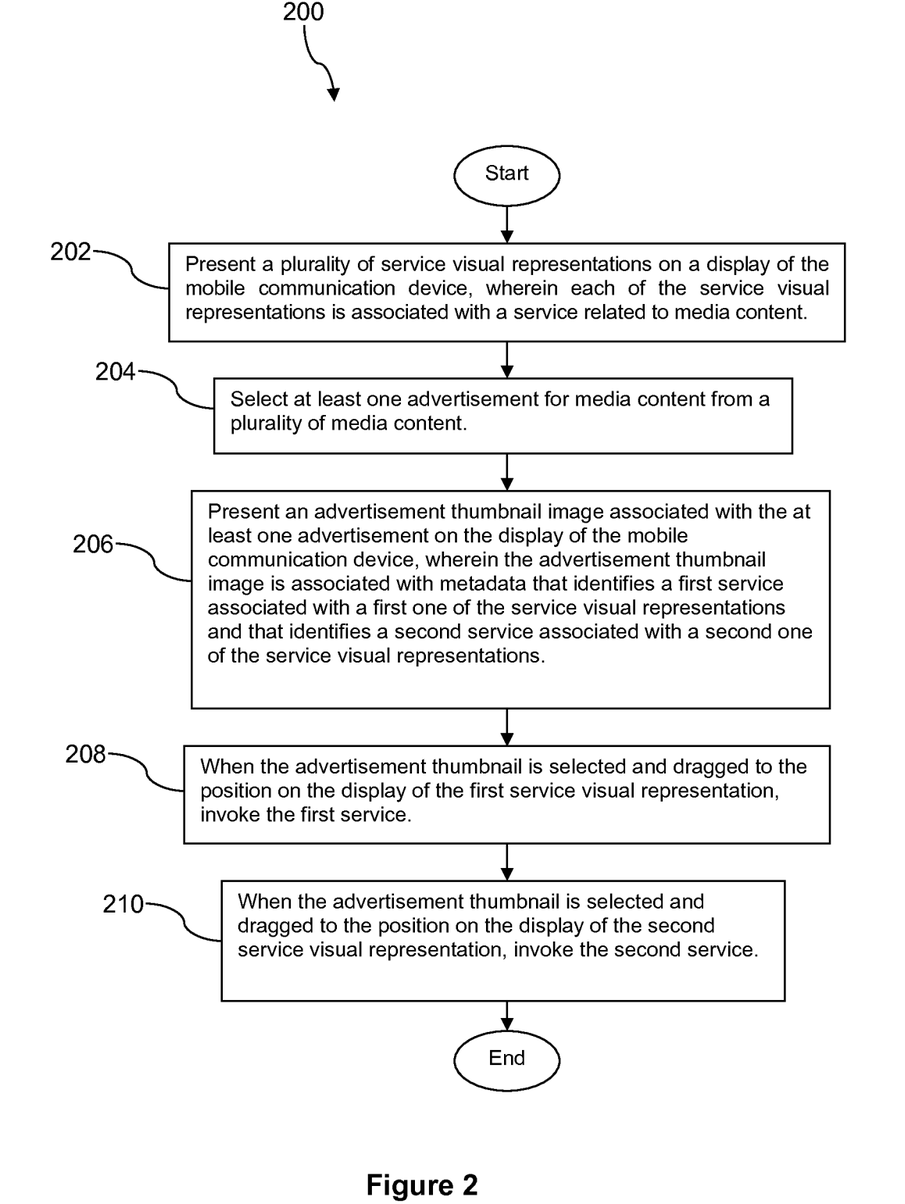
FIG. 2 is a flow chart of a method according to an embodiment of the disclosure.

Turning now to FIG. 2, a method 200 is described. At block 202, a plurality of service visual representations are presented on a display of the mobile communication device, wherein each of the service visual representations is associated with a service related to media content. At block 204, at least one advertisement for media content is selected from a plurality of media content. At block 206, an advertisement thumbnail image associated with the at least one advertisement is presented on the display of the mobile communication device, wherein the advertisement thumbnail image is associated with metadata that identifies a first service associated with a first one of the service visual representations and that identifies a second service with a second one of the service visual representations. At block 208, when the advertisement thumbnail is selected and dragged to the position on the display of the first one of the service visual representations, the first service is invoked. At block 210, when the advertisement thumbnail is selected and dragged to the position on the display of the second one of the service visual representations, the second service is invoked.

Figure 3:
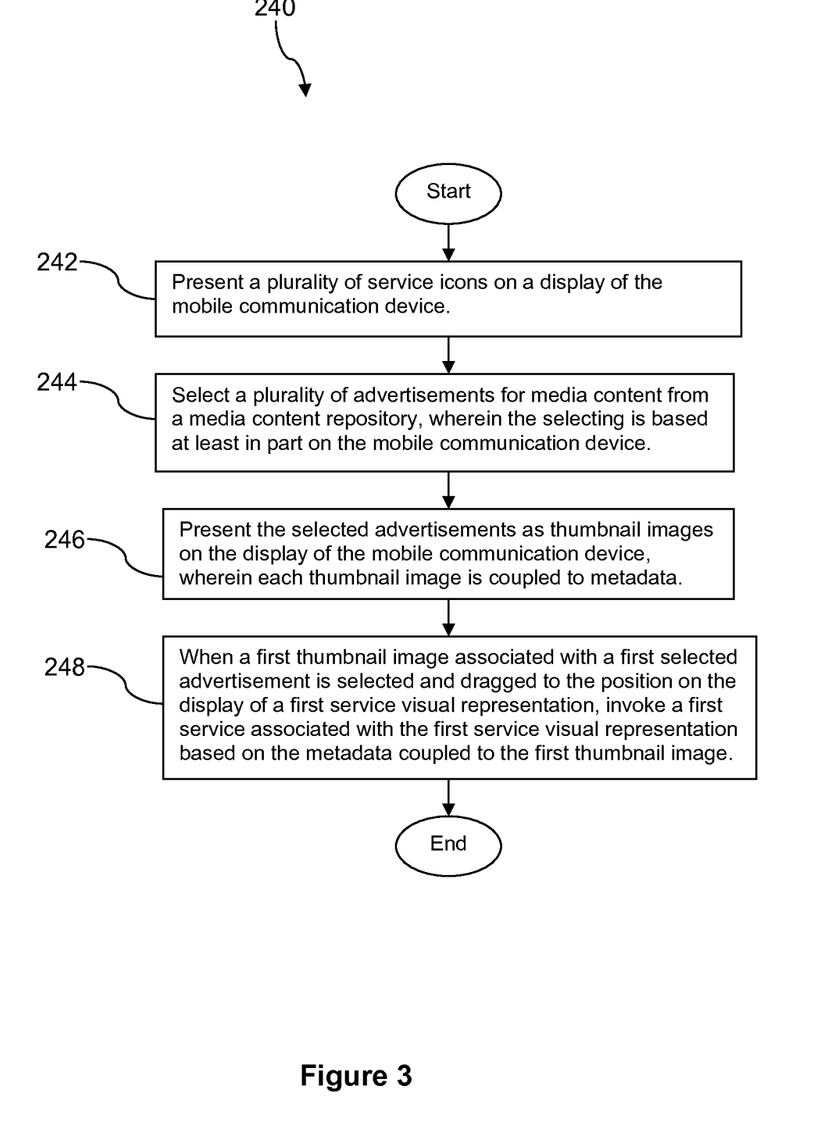
FIG. 3 is a flow chart of another method according to an embodiment of the disclosure.

Turning now to FIG. 3, a method 240 is described. At block 242, a plurality of service icons or service visual representations are presented on a display of the mobile communication device. At block 244, a plurality of advertisements for media content are selected from a media content repository, wherein the selecting is based at least in part on the mobile communication device. The advertisements may be coupled to or comprise metadata that provide information about the advertisement. For example, the advertisements may be selected based in part on a screen size or resolution of a display of the mobile communication device. Alternatively, the advertisements may be selected based in part on a data throughput capacity of the mobile communication device or of a wireless communication service plan of the mobile communication device. Alternatively, the advertisements may be selected based in part on demographics associated with the user of the mobile communication device. Alternatively, the advertisements maybe selected based in part on a history of user interaction with the mobile communication device and/or with previous promotional content. Alternatively, the advertisements may be selected based in part on the metadata coupled to the advertisement.

At block 246, the selected advertisements are presented as thumbnail images on the display of the mobile communication device, wherein each thumbnail image is coupled to metadata. At block 248, when a first thumbnail image associated with a first selected advertisement is selected and dragged to the position on the display of a first service icon or service visual representation, a network service associated with the first service icon is invoked based on the metadata coupled to the first thumbnail image. In an alternative embodiment, the metadata coupled to the advertisements may comprise method invocations for each of the service visual representations, and when the thumbnail associated with an advertisement is dropped on a specific service visual representations (e.g., the subject thumbnail is selected and dragged to the position on the display of a specific service visual representation), the method invocation associated with that specific service visual representation is selected from the metadata coupled to the advertisement thumbnail and then executed, thereby invoking the specific service.

Figure 4:
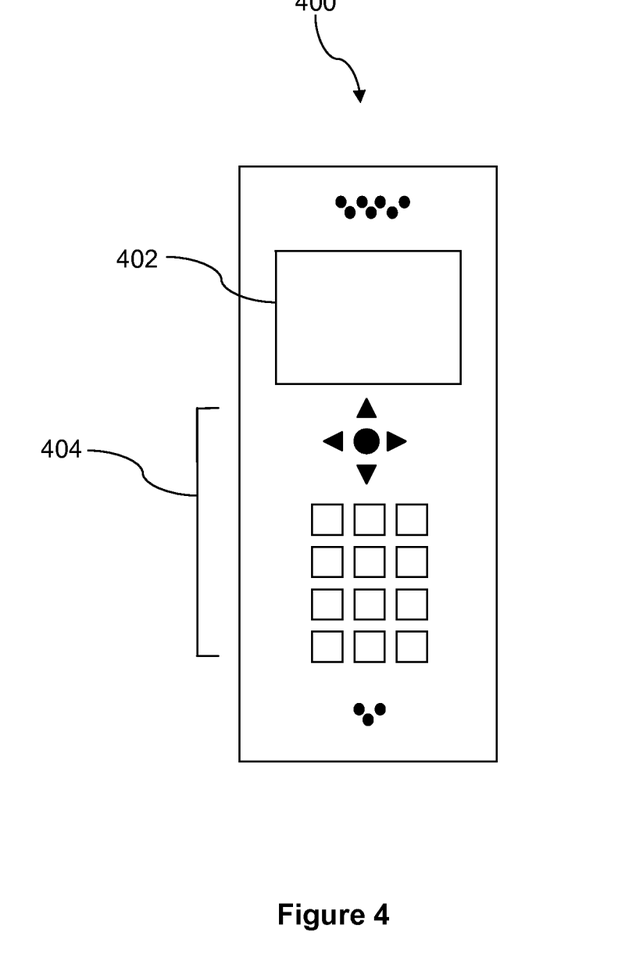
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
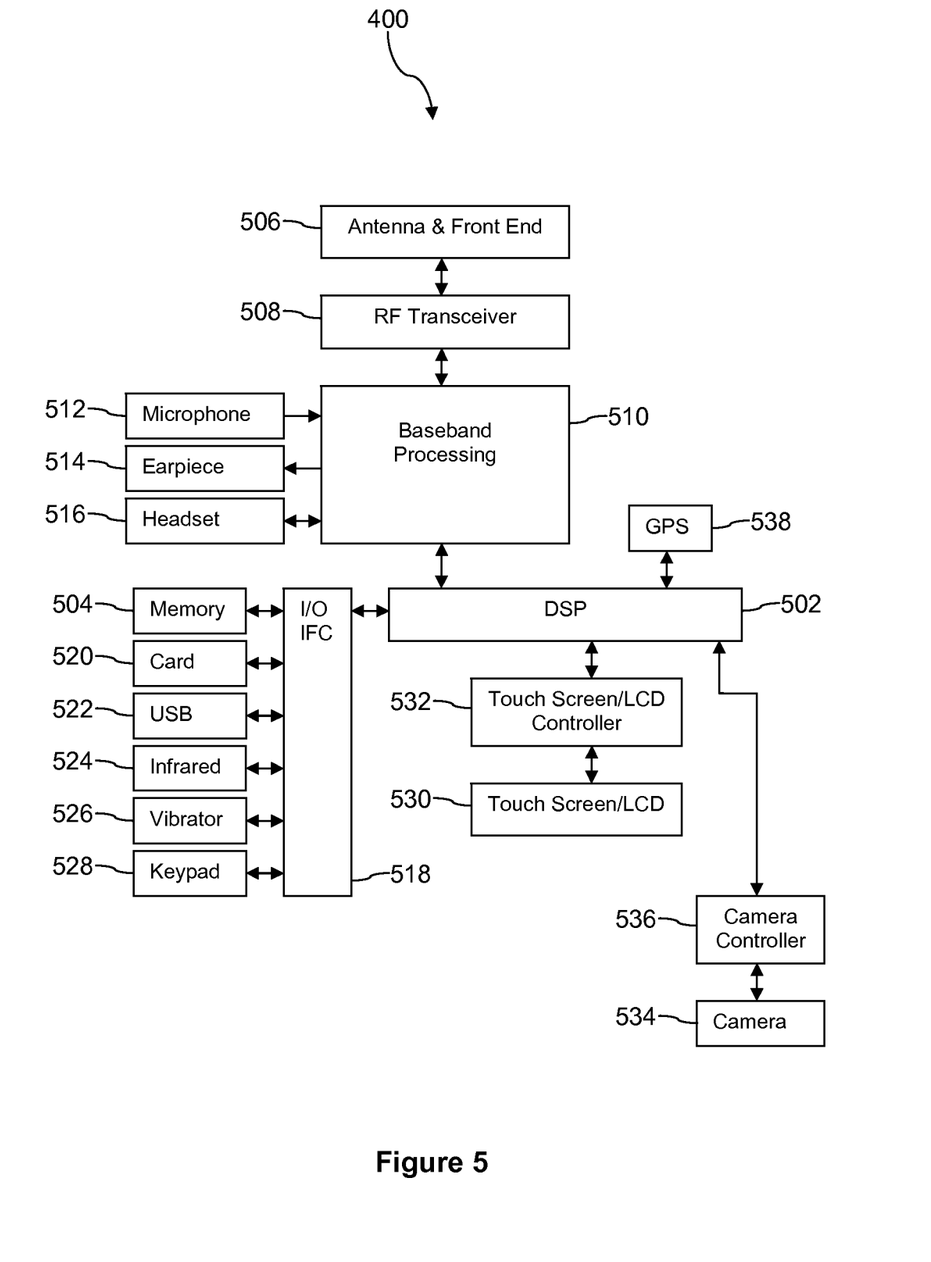
FIG. 5 is a block diagram of a hardware architecture for a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
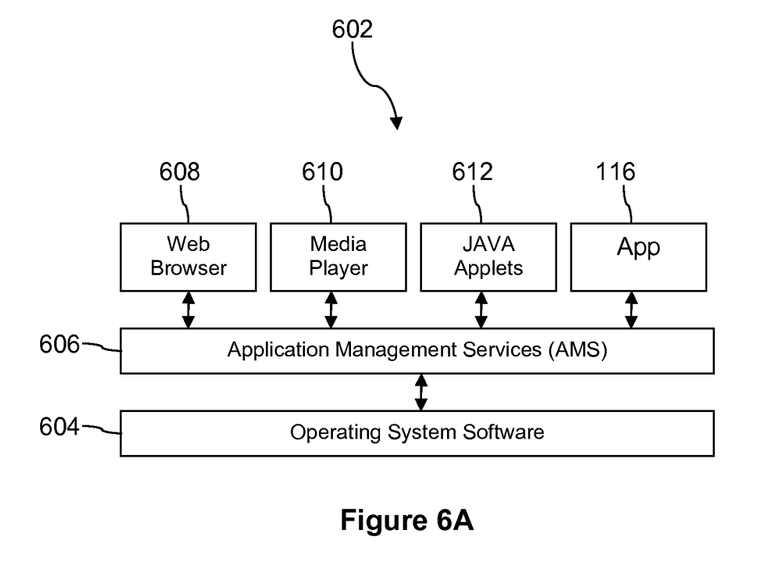
FIG. 6A is a block diagram of a software architecture for a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
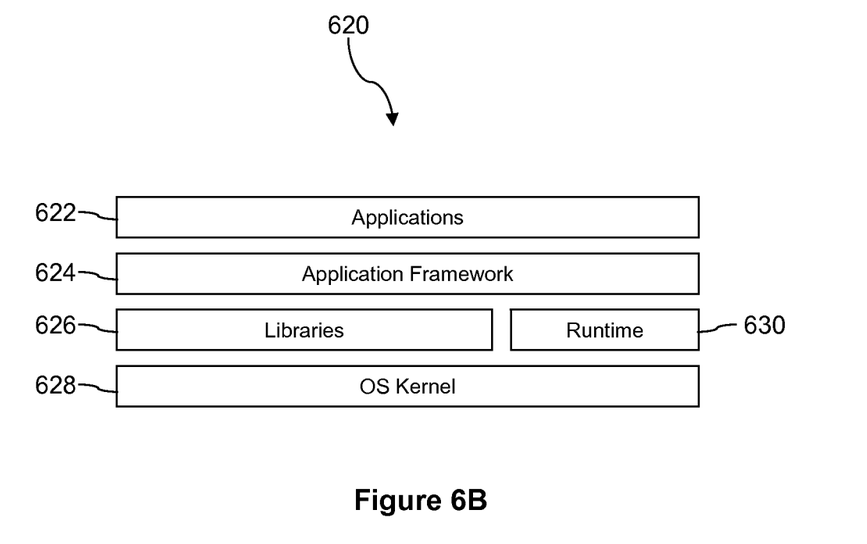
FIG. 6B is a block diagram of another software architecture for a mobile communication device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
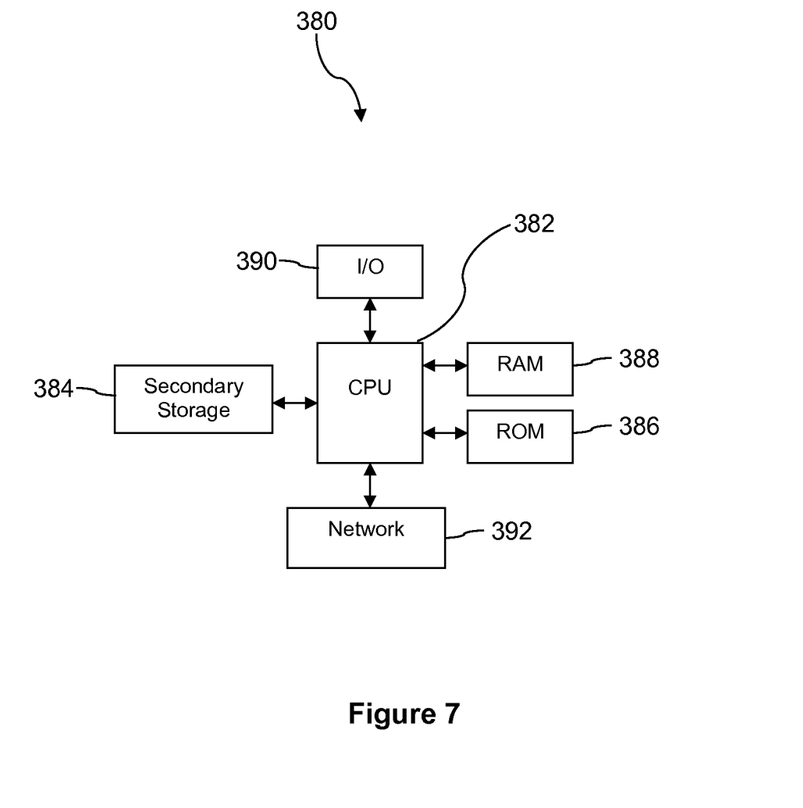
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device having an application for invoking services related to media content, said mobile communication device comprising:
   a non-transitory memory;
   a display;
   a processor coupled to the non-transitory memory and the display; and
   an application stored in the non-transitory memory that, when executed by the processor:
      enables a first visual representation of a first service linking to a first application programming interface (API) of the first service and places the first visual representation on the display at a first grid location,
      enables a second visual representation of a second service linking to a second API of the second service and places the second visual representation on the display at a second grid location, wherein the first service is different from the second service, and wherein the first service is a different type of service than the second service,
      enables a thumbnail of an advertisement and metadata coupled to the thumbnail that identifies a first invocation method for the first API of the first service and that identifies a second invocation method for the second API of the second service, determines if a location of the thumbnail of the advertisement corresponds to the first grid location or the second grid location on the display,
in response to determination that the location of the thumbnail on the display corresponds to the first grid location of the first visual representation:
obtains an identification of the first service, and
based on the identification of the first service, invokes the first service by invoking the first API through execution of the first invocation method in the metadata, and
in response to determination that the location of the thumbnail on the display corresponds to the second grid location of the second visual representation:
obtains an identification of the second service, and
based on the identification of the second service, invokes the second service by invoking the second API through execution of the second invocation method in the metadata.

2. The mobile communication device of claim 1, wherein the application selects the advertisement from a plurality of media content based in part on a bidding process among advertisers that supply the media content.

3. The mobile communication device of claim 1, wherein the application selects the advertisement from a plurality of media content based in part on a user profile associated with the mobile communication device.

4. The mobile communication device of claim 1, wherein the application stores user input events associated with invoking a plurality of services including the first service and the second service, analyzes the user input events to develop a service utilization profile associated with the mobile communication device, and selects the advertisement from a plurality of media content based in part on the service utilization profile associated with the mobile communication device.

5. The mobile communication device of claim 1, wherein the application presents a plurality of visual representations associated with services, and wherein the plurality of visual representations comprises at least one media player service visual representation, at least one media on-line store service visual representation, and at least one media analysis service visual representation in a default presentation mode.

6. The mobile communication device of claim 5, wherein the application presents a control that, when activated, causes the application to present different visual representations than the plurality of visual representations presented while in the default presentation mode.

7. A method of accessing services from a mobile communication device, comprising:
enabling, by an application stored in a non-transitory memory of a mobile communication device and executable by a processor of the mobile communication device, a first visual representation of a first service linking to a first application program interface (API) of the first service;
placing, by the application, the first virtual representation on a display of the mobile communication device at a first grid location;
enabling, by the application, a second visual representation of a second service linking to a second API of the second service, wherein the first service is a different type of service than the second service;
placing, by the application, the second visual representation on the display at a second grid location;
enabling, by the application, a thumbnail of an advertisement and metadata coupled to the thumbnail that identifies a first invocation method for the first API of the first service and that identifies a second invocation method for the second API of the second service;
determining, by the application, if a location of the thumbnail of the advertisement corresponds to the first grid location or the second grid location on the display;
in response to determining that the location of the thumbnail on the display corresponds to the first grid location of the first visual representation:
obtaining, by the application, an identification of the first service, and
based on the identification of the first service, invoking, by the application, the first service by invoking the first API through execution of the first invocation method in the metadata; and
in response to determining that the location of the thumbnail on the display corresponds to the second grid location of the second visual representation:
obtaining, by the application, an identification of the second service, and
based on the identification of the second service, invoking, by the application, the second service by invoking the second API through execution of the second invocation method in the metadata.

8. The method of claim 7, wherein the first invocation method and the second invocation method comprise at least one of a parameter or argument.

9. The method of claim 7, further comprising dynamically downloading the first and second visual representations via a cellular wireless communication link to the mobile communication device.

10. The method of claim 9, wherein the dynamically downloading comprises requesting references to the first and second visual representations from a web site, and wherein the requesting is performed periodically or is performed in response to a trigger event.

11. The method of claim 7, wherein the first and second visual representations are associated with at least one of a media player, an on-line media store, a ticket purchasing widget, or a media analysis tool.

12. The method of claim 7, further comprising activating a control input to retrieve a previously presented thumbnail image that is not presently presented on the display of the mobile communication device.

13. A method of accessing services from a mobile communication device, comprising:
enabling, by an application stored in a non-transitory memory of a mobile communication device and executable by a processor of the mobile communication device, a plurality of visual representations of a plurality of different services on a display of the mobile communication device, wherein a first visual representation of the plurality of visual representations links to a first application program interface (API) of a first service of the plurality of different services, wherein the first service is a different type of service than other services of the plurality of different services;
placing, by the application, the first virtual representation on a display of the mobile communication device at a first grid location;
enabling, by the application, a thumbnail of an advertisement and metadata coupled to the thumbnail that identifies a plurality of invocation methods for a plurality of APIs of the plurality of different services including a first invocation method for the first API of the first service;

determining, by the application, if a location of the thumbnail of the advertisement corresponds to the first grid location; and in response to determining that the location of the thumbnail on the display corresponds to the first grid location of the first visual representation, obtaining, by the application, an identification of the first service, and based on the identification of the first service, invoking, by the application, the first service by invoking the first API through execution of the first invocation method in the metadata.

14. The method of claim 13, further comprising selecting a plurality of advertisements for media content from a media content repository, wherein the selecting is based at least in part on the mobile communication device, wherein each advertisement of the plurality of selected advertisements for media content is selected from a different media content category.

15. The method of claim 14, wherein the media content categories comprise music content, video content, and gaming content.

16. The method of claim 13, further comprising removing, by the application, the first visual representation associated with a category of service from presentation on the display based on receiving a control input of the mobile communication device; and in response to receiving the control input, presenting, by the application, on the display a second visual representation associated with the category of service.

17. The method of claim 13, wherein the plurality of visual representations presented on the display is downloaded based on a file controlled by a wireless service provider.

18. The method of claim 14, wherein the plurality of visual representations are presented in a rectangular grid on the display of the mobile communication device and the selected advertisements are presented below the plurality of visual representations on the display of the mobile communication device.

* * * * *